Aug. 12, 1969  J. E. BAKER ET AL  3,460,649
TREE CLIMBING-HUNTING PLATFORM
Filed Nov. 21, 1967
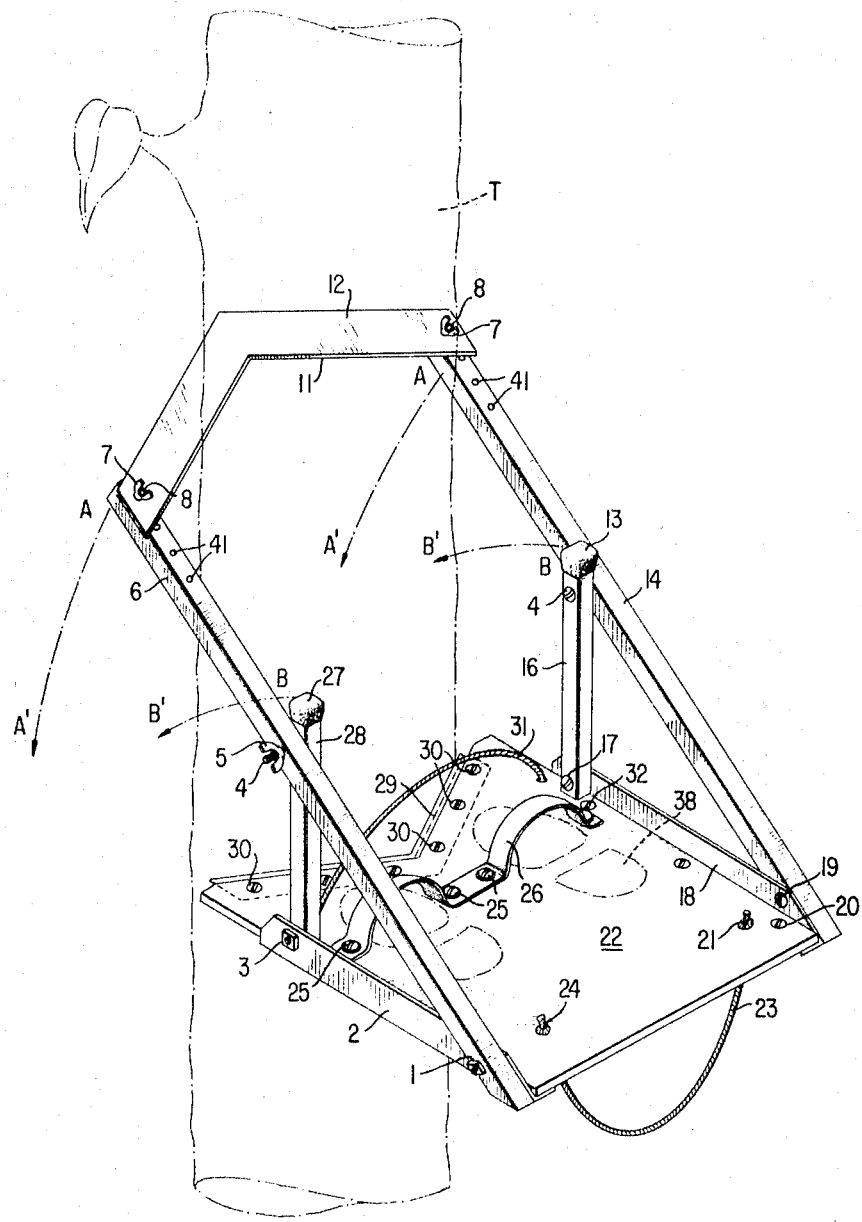
INVENTORS
JAMES E. BAKER
FRED L. WALTERS, III
BY *Alexander* 
ATTORNEYS United States Patent Office 3,460,649
Patented Aug. 12, 1969

3,460,649
TREE CLIMBING-HUNTING PLATFORM
James E. Baker, 2202 Pinecliff Drive, and Fred L. Walters III, 2106 Park Lane, both of Valdosta, Ga. 31601
Filed Nov. 21, 1967, Ser. No. 684,877
Int. Cl. E04g 3/10
U.S. Cl. 182—187
7 Claims

ABSTRACT OF THE DISCLOSURE

The tree climbing-hunting platform has a base plate adapted to be positioned substantially horizontally against the side of a tree; with a V-shaped blade extending from the rear edge of the plate adapted to bite into the tree. Angularly disposed frame members extend upwardly and rearwardly from the front end of the plate beyond the said blade; and a second V-shaped blade is removably and adjustably secured to the rear ends of the frame members and has a sharpened inner edge adapted to bite into the opposite side of the tree from the first blade. The blades embracing the tree therebetween at different elevations; and a foot strap is secured upon the top of the plate adapted to overlie the feet of a person standing on the plate while facing the tree, so that the person by placing his arms around the tree and pulling upwardly with his feet may climb the tree thereby raising the plate with respect to the tree, the plate remaining self-supporting in raised position whenever the weight of the person is again distributed on the plate.

---

This invention relates, broadly construed, to portable tree or pole climbing and hunting platforms, and more particularly relates to a platform which when properly attached to the feet of a person in an unfolded manner will allow him by gripping the pole or tree with his arms, to climb the tree, and then disengage his feet therefrom and then use the platform for the purpose of standing or sitting thereon while hunting, or for any other uses where a platform on a tree or pole may be required.

The principal objects of the invention are to provide:

(1) A hunting platform upon which one may stand upright or be seated, and which by the weight of the individual will support itself upon a tree or pole;

(2) A hunting platform which by use of foot straps and a heel support a person without any other extraneous device can climb a pole to the height desired;

(3) A portable hunting platform which may be folded and carried with the hunter or other user;

(4) A hunting platform in which the basic principal of support is the biting or cutting of the angled blades in the sides of the tree so that the only way that the blades may be disengaged is by lifting the weight of the person using it from the platform;

(5) A hunting platform which, with weight applied thereto, is secured on the pole or tree.

We will explain the invention with reference to the accompanying drawing, which illustrates one practical embodiment thereof, to enable others familiar with the art to adopt and use the same; and will summarize in the claims the essential features of the invention and novel combinations of parts for which protection is desired.

In said drawing, the figure shows a perspective view of our novel tree climbing-hunting platform applied to a pole or tree.

As shown in the drawing, the invention consists of a substantially rectangular platform base plate 22 formed of plywood or Fiberglas, the same having a V-shaped notch at its inner end adapted to receive an aluminum V-shaped angle blade 29 which is attached to base plate 22 by screws 30, the outer edge of the blade 29 being sharpened so as to cut or bite into the exterior of the pole or tree T when engaged therewith.

At the sides of the platform 22 are angle irons 2 and 18, respectively, preferably of steel or aluminum, the horizontal flanges of which support base plate 22 and the frame of the device, the horizontal flanges of the angle irons 2 and 18 being secured to the platform 22 by round-headed bolts 20 and 32 provided with nuts thereon. Adjacent the outer ends of the angle irons 2 and 18 are bolts 19 extending through perforations in the vertical flanges on the angle irons 2 and 18, the bolts 19 carrying nuts 1 thereon.

Pivoted on the bolts 19 are the lower ends of box tubular frame members 6 and 14, respectively, the frame members 6 and 14 extending upwardly and rearwardly beyond the blade 29 as shown; and embracing the upper ends of the frame members 6 and 14 is a V-shaped aluminum blade 12 having a sharpened inner edge 11 for engaging the opposite side of the pole or tree T from the blade 29 when in use. As shown, the upper ends of the frame members 6 and 14 are provided with the series of holes 41 extending therethrough for the reception of bolts 8 passing through any one of the perforations 41 and through holes in the sides of the blade 12 and being secured thereon by wing nuts 8, the wing nuts allowing quick blade assembly and disassembly, and the series of holes 41 permitting adjustment of the device to suit poles or trees of various diameters or sizes; also adjustment of the working angle of the blade 12 with respect to the tree or pole.

In order to maintain the frames 6 and 14 in angular relationship with the base plate 22, we provide box tubular aluminum columns 16 and 28, which are pivotally connected at their lower ends of the rear portions of the angle irons 2 and 18 by means of bolts 17 passing through perforations in the lower ends of the columns 16 and 18 and through the vertical flanges of the angle irons 12 and 18, the bolts 17 being secured in position by nuts 3. The upper ends of the columns 16 and 28 are secured to the frame members 6 and 14 by bolts 4 passing through perforations in the upper ends of the columns 16 and 28 and through perforations in the frame members 6 and 14, the same being secured in position by wing nuts 5 permitting quick assembly and disassembly of the parts. The upper ends of the columns 16 and 28 may be closed by plastic caps 13 and 27, respectively.

Upon the top of the platform base plate 22, we provide a cotton, rayon or nylon webbing strap 26, used as a foot strap, the strap being joined at its ends and middle portion to the plywood or Fiberglas platform base plate 22 by means of wood screws 25 and washers, the strap 26 being so arranged to fit over the instep of the user's feet when positioned on the platform as indicated by the dot-and-dash lines 38 in the drawing. In order to maintain the user's feet engaged with the strap 26 when in use, we provide a cord or rope 31 having its ends knotted and passing through perforations in the platform base plate 22 as shown in the drawing, the length of the rope 31 being of length sufficient to be engaged behind the wearer's heels to hold his feet engaged with the foot strap 26 while the pole or tree climbing operation is being performed.

We also provide a rope 23 having its ends knotted as at 21 and 24, respectively, and passing through the base plate 22, adjacent its outer ends, the rope 23 being useable as a foot rest when the person is seated upon the platform 22 rather than standing thereon. Also the rope 23 may be used as a carrying strap for conveniently holding various articles which the user might wish, or have need of, while seated or standing on the platform.

In carrying out the concept of the invention, one end of the blade 12 is loosened from frame member 6 by removing wing nut 7 and the blade 12 then extended around the pole or tree T with the platform 22 resting on the ground. The blade 12 is then reclosed and refastened to frame member 6 in reverse order, reapplying wing nut 7.

The person using the platform then places his feet in the area 38 shown for the location of the feet, with the rope 31 positioned behind his heels. The person then places his hands and arms around the tree T and pulls upwardly with his feet, and the blade 12 with its sharp edge 11 and the blade 29 will again engage the tree or pole T when the weight of the person is redistributed to the platform. This method of climbing is repeated until the desired height is obtained. The platform is held securely aginst the pole or tree T since a person's weight being placed on platform 22 will cause blade 12 to be pulled downwardly and inwardly against the pole or tree T and at the same time blade 29 will be pushed into the tree.

The novelty of the invention resides with the fact that it is not only a tree climbing device but that it is self-supporting without further attachments, and that by adjusting blade 12 using the additionally provided holes 41, the platform may be adjusted to suit various sizes or diameters of trees or poles T. Further the blades designated 12 and 29 are sharpened so that they cut or bite into the exterior of the pole or tree T, actually furnishing or providing an attachment thereto.

By removing the wing nuts 5 and bolts 4 from the columns 28 and 16, the stand may be collapsed with the frame members 6 and 14 folding in an arc designated A–A', and supports 28 and 16 folding in an arc designated B–B'.

The invention features the use of lightweight aluminum for all of this framework with the possible exception of angle irons 2 and 18 which may be constructed of angled steel.

We do not limit our invention to the exact form shown in the drawing, for obviously changes may be made therein within the scope of the claims.

We claim:

1. A tree climbing-hunting platform comprises a base plate adapted to be positioned substantially horizontally against the side of a tree; a V-shaped blade extending from the rear edge of the plate adapted to bite into the tree; angularly disposed frame members extending upwardly and rearwardly from the front end of the plate beyond the said blade; a second V-shaped blade removably and adjustably secured to the rear ends of the frame members and having a sharpened inner edge adapted to bite into the opposite side of the tree from the first blade, said blades embracing the tree therebetween at different elevations; and a foot strap secured upon the top of the plate adapted to overlie the feet of a person standing on the plate while facing the tree, whereby the person by placing his arms around the tree and pulling upwardly with his feet may climb the tree thus raising the plate with respect to the tree, the plate remaining self-supporting in said raised position whenever the weight of the person is again distributed on the plate.

2. In a platform as set forth in claim 1, said base plate being substantially rectangular and having a V-shaped notch in its rear edge; and said first blade corresponding in shape with said notch and being secured to said plate.

3. In a platform as set forth in claim 1, a rope on said plate having its ends secured thereto in advance of the foot strap, said rope being adapted to be positioned behind the heels of the person when his feet are engaged in said foot strap.

4. In a platform as set forth in claim 1, said base plate being substantially rectangular; angle irons at the sides of the plate having their horizontal flanges secured to the base plate; the lower ends of said frame members being pivotally connected to the vertical flanges of said angle irons adjacent their outer ends; and vertical columns having their lower ends pivotally connected to the vertical flanges of the angle irons adjacent their rear ends, the upper ends of said columns being removably secured to the frame members intermediate their ends, whereby the frame members and columns may when disconnected from each other be swung down into the plane of the base plate.

5. In a platform as set forth in claim 1, the rear ends of the frame members having a series of holes therethrough receiving bolts connecting the ends of the second blade thereto to permit adjustment of the second blade to suit various diameters of trees and adjustment of the angularity of the second blade with respect to the tree.

6. In a platform as set forth in claim 1, a second rope having its ends secured to the base plate adjacent its front end and depending therefrom, and adapted to form a foot-rest for the person when seated upon the base plate.

7. In a platform as set forth in claim 1, said frame member and columns being formed of box tubular aluminum; said base plate being formed of plywood; and said angle irons and blades being formed of aluminum.

References Cited

UNITED STATES PATENTS

| | | | |
|---|---|---|---|
| 1,187,078 | 6/1916 | May | 182—187 |
| 2,991,842 | 7/1961 | Hardin | 182—187 |
| 3,067,821 | 11/1962 | Hundley | 182—187 |
| 3,338,332 | 8/1967 | Brantly | 182—187 |

REINALDO P. MACHADO, Primary Examiner